(12) United States Patent
He et al.

(10) Patent No.: US 11,836,898 B2
(45) Date of Patent: Dec. 5, 2023

(54) METHOD AND APPARATUS FOR GENERATING IMAGE, AND ELECTRONIC DEVICE

(71) Applicants: Beijing Kingsoft Cloud Network Technology Co., Ltd., Beijing (CN); Beijing Kingsoft Cloud Technology Co., Ltd., Beijing (CN)

(72) Inventors: Qinwen He, Beijing (CN); Hongfei Fan, Beijing (CN); Yuan Cai, Beijing (CN)

(73) Assignees: Beijing Kingsoft Cloud Network Technology Co., Ltd., Beijing (CN); Beijing Kingsoft Cloud Technology Co., Ltd., Beijing (CN)

( * ) Notice: Subject to any disclaimer, the term of this patent is extended or adjusted under 35 U.S.C. 154(b) by 454 days.

(21) Appl. No.: 17/259,907

(22) PCT Filed: Sep. 23, 2020

(86) PCT No.: PCT/CN2020/117213
§ 371 (c)(1),
(2) Date: Jan. 12, 2021

(87) PCT Pub. No.: WO2021/082819
PCT Pub. Date: May 6, 2021

(65) Prior Publication Data
US 2021/0295475 A1    Sep. 23, 2021

(30) Foreign Application Priority Data
Oct. 31, 2019    (CN) .......................... 201911055646.9

(51) Int. Cl.
*G06T 5/00*    (2006.01)
*G06T 7/00*    (2017.01)
(Continued)

(52) U.S. Cl.
CPC ............ *G06T 5/001* (2013.01); *G06F 18/241* (2023.01); *G06T 5/002* (2013.01); *G06T 5/003* (2013.01);
(Continued)

(58) Field of Classification Search
CPC ......... G06T 5/001; G06T 5/002; G06T 5/003; G06T 7/0002; G06T 2207/20021;
(Continued)

(56) References Cited

U.S. PATENT DOCUMENTS

2004/0126033 A1\* 7/2004 Ishizaka .................. G06T 5/002
382/254
2005/0100236 A1\* 5/2005 Kong ..................... G06V 10/50
375/E7.176
(Continued)

FOREIGN PATENT DOCUMENTS

CN    1402191 A    3/2003
CN    103905822 A    7/2014
(Continued)

OTHER PUBLICATIONS

Cui, et al., (2012). The Research of Image Quality Assessment Methods. Physics Procedia. 25. 485-491. 10.1016/j.phpro.2012.03.115.
(Continued)

*Primary Examiner* — Jose L Couso
(74) *Attorney, Agent, or Firm* — Suiter Swantz pc llo (57) ABSTRACT

An method and an apparatus for generating an image, and an electronic device are provided. The method comprises: performing a plurality of types of image enhancement processing on an image to be processed respectively to obtain a plurality of pre-enhanced images; performing image quality classification on a first image block in the image to be processed to obtain a first quality classification result for
(Continued)

the first image block; determining a target pre-enhanced image from the plurality of pre-enhanced images based on the first quality classification result for the first image block; determining a second image block in the target pre-enhanced image; and generating a target image based on the second image block. Since quality classification is performed on the first image block, the influencing factors which affect the image quality of the first image block can be determined, and in conjunction with that the second image block is determined through the pre-enhanced images to generate a target image, thereby the image enhancement effect is improved.

12 Claims, 2 Drawing Sheets

(51) Int. Cl.
  *G06F 18/241* (2023.01)
  *G06V 10/98* (2022.01)
(52) U.S. Cl.
  CPC .......... *G06T 7/0002* (2013.01); *G06V 10/993* (2022.01)
(58) Field of Classification Search
  CPC . G06T 2207/20084; G06T 2207/30168; G06T 2207/10016; G06T 2207/20012; G06T 2207/10152; G06T 5/00; G06T 5/005; G06T 2207/20008; G06T 2207/20192; G06T 7/10; G06T 7/13; G06F 18/241; G06F 18/24; G06V 10/993; G06V 10/764; G06V 10/765; G06V 10/80; G06V 10/87; G06V 10/809; G06V 20/41; G06V 20/698; G06V 30/19113; G06V 30/19173; G06V 30/36; G06V 30/413; G06V 40/1365; G06V 40/172; G06V 40/197; G06V 40/394; H04N 19/59; H04N 19/85; H04N 23/81; H04N 25/60; H04N 5/208; G06K 9/6267; G06K 9/626; G06K 9/6288; G06K 9/6292; G06K 9/00718; G06K 9/00147; G06K 9/00422; G06K 9/00087; G06K 9/00288; G06K 9/00617; G06K 9/00181; G06K 9/6227
  See application file for complete search history.

(56) References Cited

U.S. PATENT DOCUMENTS

| | | | | |
|---|---|---|---|---|
| 2008/0019605 A1* | 1/2008 | Yea | ............................ | G06T 5/50 382/261 |
| 2008/0317358 A1* | 12/2008 | Bressan | ............... | G06V 30/413 382/254 |
| 2008/0317378 A1* | 12/2008 | Steinberg | ................ | G06T 5/003 348/E5.081 |
| 2009/0148003 A1* | 6/2009 | Chen | .................... | G06V 30/164 382/112 |
| 2012/0015825 A1 | 1/2012 | Zhong et al. | | |
| 2012/0113287 A1 | 5/2012 | Johnson et al. | | |
| 2014/0086486 A1* | 3/2014 | Pillman | .................. | G06T 7/194 382/173 |
| 2014/0169685 A1* | 6/2014 | Chen | .................... | G06V 10/751 382/218 |
| 2015/0043810 A1 | 2/2015 | Deng et al. | | |
| 2016/0165178 A1 | 6/2016 | al-Salem et al. | | |
| 2017/0177979 A1* | 6/2017 | Chokshi | ................. | G06V 10/82 |
| 2019/0327124 A1 | 10/2019 | Lai et al. | | |
| 2021/0004650 A1* | 1/2021 | Frank | .................. | G06F 18/2415 |

FOREIGN PATENT DOCUMENTS

| | | | | |
|---|---|---|---|---|
| CN | 104115482 A | 10/2014 | | |
| CN | 105894507 A | 8/2016 | | |
| CN | 106251318 A | 12/2016 | | |
| CN | 107224359 A | 10/2017 | | |
| CN | 107481238 A | 12/2017 | | |
| CN | 107545544 A | 1/2018 | | |
| CN | 108629747 A | 10/2018 | | |
| CN | 109685785 A | 4/2019 | | |
| CN | 109697705 A | 4/2019 | | |
| CN | 109859152 A | 6/2019 | | |
| CN | 109949264 A | 6/2019 | | |
| CN | 110363753 A | 10/2019 | | |
| CN | 110796624 A | 2/2020 | | |
| WO | 2006022729 A1 | 3/2006 | | |
| WO | WO-2016048498 A1 * | 3/2016 | ............. | B41J 2/473 |
| WO | 2019144469 A1 | 8/2019 | | |

OTHER PUBLICATIONS

Alkinani, Haider, et al., (2017). Patch-based models and algorithms for image denoising: a comparative review between patch-based images denoising methods for additive noise reduction. EURASIP Journal on Image and Video Processing. 2017. 58. 10.1186/s13640-017-0203-4.
Office Action in Chinese Application No. 201911055646.9 dated Dec. 12, 2021, 10 pages.
Ou Shifeng, et al., Soft Decision Based Gaussian-Laplacian Combination Model for Noisy Speech Enhancement[J]. Chinese Journal of Electronics, 2018, 27(4): 827-834. doi: 10.1049/cje.2018.05.015.
Office Action in Indian Application No. 202127000173 dated Jun. 27, 2022, 9 pages.
Mingkun, Feng (2016).Research on Methods of Image Quality Comprehensive Assessment based on Visual Characteristics (Publication No. 2011010128) [Doctoral Assertation, Nanjing University of Posts and Telecommunications]. China Academic Journal Electronic Publishing House.
Li, YanMei, "Research on Key Techniques of Image Enhancement and its Applications", A Doctoral Dissertation Submitted to University of Electronic Science and Technology of China, Jun. 2013, 137 pages.

* cited by examiner

FIG. 5

METHOD AND APPARATUS FOR GENERATING IMAGE, AND ELECTRONIC DEVICE

The present application is based on, and claims a priority to a Chinese patent application No. 201911055646.9, filed with the China National Intellectual Property Administration on Oct. 31, 2019 and entitled "METHOD AND APPARATUS FOR GENERATING AN IMAGE, AND ELECTRONIC DEVICE", which is incorporated herein by reference in its entirety.

TECHNICAL FIELD

The present application relates to the technical field of image processing, and in particular to a method and an apparatus for generating an image, and an electronic device.

BACKGROUND

With the continuous development of society and the continuous advancement of image capture technology, more and more people are willing to capture images through electronic devices to record their lives. However, due to the influence of device, environment and other factors, various noises are generated in the process of image acquisition and generation, which will affect the image quality of the image. For example, when the light in the shooting environment is insufficient and the shooting environment is too dark, the captured image can generate acquisition noise, and during the shooting process, the movement of the object, the shaking of the electronic device, or the defocus of the shooting object will cause the captured image to become blurred. There are some image enhancement processing methods in the related art, but when they are used for image enhancement, the image can only be enhanced roughly for one influencing factor, and the effect of image enhancement is not good.

SUMMARY

The object of the embodiments of the present application is to provide a method and an apparatus for generating an image, and electronic device to improve the effect of image enhancement. The specific technical solutions are as follows.

An embodiment of the present application provides a method for generating an image, including: performing a plurality of types of image enhancement processing on an image to be processed respectively to obtain a plurality of pre-enhanced images, wherein each of the pre-enhanced images corresponds to one type of image enhancement processing, and each type of the image enhancement processing corresponds to an influencing factor which affects image quality; performing image quality classification on a first image block in the image to be processed to obtain a first quality classification result for the first image block, wherein the first quality classification result is used to indicate influencing factors existing in the first image block which affect the image quality; determining a target pre-enhanced image from the plurality of pre-enhanced images based on the first quality classification result for the first image block, wherein the type of image enhancement processing corresponding to the target pre-enhanced image is matched with an influencing factor existing in the first image block which affects the image quality and indicated by the first quality classification result; determining a second image block in the target pre-enhanced image, wherein an area where the second image block is located in the pre-enhanced image is the same as an area where the first image block is located in the image to be processed; and generating a target image based on the second image block.

An embodiment of the present application further provides an apparatus for generating an image, comprising: an image enhancement processing module configured for performing a plurality of types of image enhancement processing on an image to be processed respectively to obtain a plurality of pre-enhanced images, wherein each of the pre-enhanced images corresponds to one type of image enhancement processing, and each type of the image enhancement processing corresponds to an influencing factor which affects the image quality; an image quality classification module configured for performing image quality classification on a first image block in the image to be processed to obtain a first quality classification result for the first image block, wherein the first quality classification result is used to indicate influencing factors existing in the first image block which affect the image quality; an image determining module configured for determining a target pre-enhanced image from the plurality of pre-enhanced images based on the first quality classification result for the first image block, wherein the type of image enhancement processing corresponding to the target pre-enhanced image is matched with the influencing factor existing in the first image block which affects image quality and indicated by the first quality classification result; a second image block determining module configured for determining a second image block in the target pre-enhanced image, wherein the area where the second image block is located in the pre-enhanced image is the same as the area where the first image block is located in the image to be processed; and a target image generation module configured for generating a target image based on the second image block.

An embodiment of the present application further provides an electronic device, comprising a processor and a memory; the memory has stored thereon computer programs which, when executed, cause the processor to perform the above-described method for generating an image.

An embodiment of the present application provides a computer-readable storage medium having stored thereon computer programs which, when executed, cause a processor to perform the above-described method for generating an image.

An embodiment of the present application further provides an electronic device, comprising a processor, a communication interface, a memory and a communication bus, wherein the processor, the communication interface and the memory communicate with each other through the communication bus; the memory is configured for storing computer programs; the processor is configured for performing the steps of any one of the above-described methods for generating image by executing the computer programs stored on the memory.

An embodiment of the present application further provides a computer program product containing instructions which, when executed, cause a computer to perform any one of the above-described methods for generating an image.

The embodiments of the present application provide a method and an apparatus for generating an image, and an electronic device. In the solution of the present application, a plurality of types of image enhancement processing can be performed on the image to be processed to obtain a plurality of pre-enhanced images, wherein each of the pre-enhanced images corresponds to one type of image enhancement processing, and each type of the image enhancement processing corresponds to an influencing factor which affects the image quality. Then, image quality classification can be performed on a first image block in the image to be processed to obtain a first quality classification result for the first image block, wherein the first quality classification result is used to indicate influencing factors existing in the first image block which affect the image quality. Then, a target pre-enhanced image can be determined from the plurality of pre-enhanced images based on the first quality classification result for the first image block, wherein the type of image enhancement processing corresponding to the target pre-enhanced image is matched with an influencing factor existing in the first image block which affects the image quality and indicated by the first quality classification result. And then, a second image block is determined in the target pre-enhanced image, wherein the area where the second image block is located in the pre-enhanced image is the same as the area where the first image block is located in the image to be processed, and the target image is generated based on the second image block. Since quality classification is perforated on the first image block, so that the influencing factors which affect the image quality of the first image block can be determined, and in conjunction with that the second image block is determined through the pre-enhanced images to generate a target image. In other words, different image blocks in the image to be processed can be enhanced respectively according to their image qualities, so that the problem of poor effect of unitary image processing on the entire image is solved, thereby the image enhancement effect is improved.

Of course, it is not necessary for any product or method of the present application to achieve all of the advantages described above at the same time.

BRIEF DESCRIPTION OF THE DRAWINGS

In order to more clearly illustrate the embodiments of the present application and the technical solutions of the related arts, the drawings required for the embodiments and the related arts are briefly described below. It is obvious that the drawings in the following description are only some embodiments of the present application. Based on these drawings, other drawings can be obtained by those skilled in the art without any creative efforts.

DETAILED DESCRIPTION

In order to make the objects, technical solutions and advantages of the present application more apparent, the present application is further described in detail below with reference to the drawings and by way of examples. Obviously, the described embodiments are only a part of the embodiments of the present application, rather than all the embodiments. All other embodiments obtained by those skilled in the art based on the embodiments in the present application without any creative efforts shall fall within the protection scope of this application.

The technical solutions in the embodiments of the present application will be clearly and completely described below with reference to the drawings in the embodiments of the present application.

Figure 1:
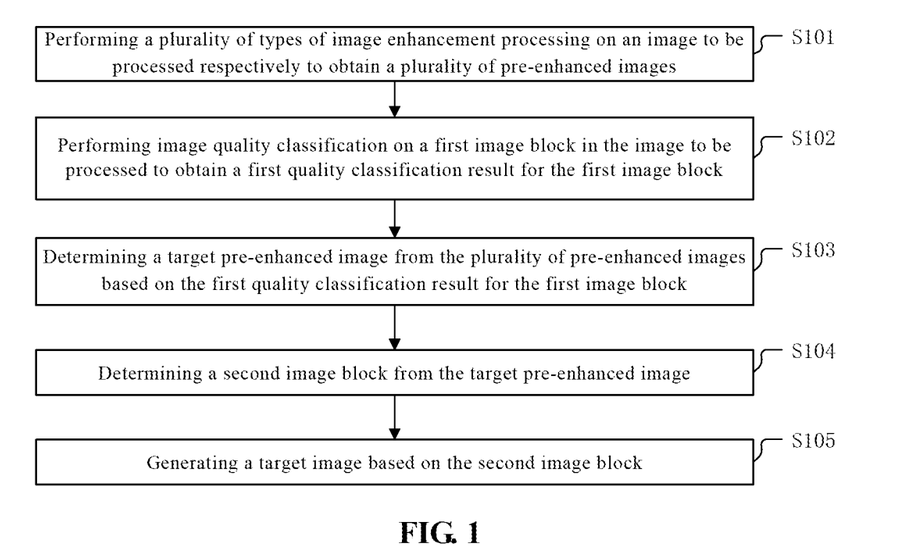
FIG. 1 is a flowchart of a method for generating an image according to an embodiment of the present application.

In one embodiment of the present application, an method for generating an image is provided, as shown in FIG. 1, which can include the following steps.

At step S101, a plurality of types of image enhancement processing are performed on an image to be processed respectively to obtain a plurality of pre-enhanced images.

In the embodiment of the present application, each of the pre-enhanced images corresponds to one type of image enhancement processing, and each type of the image enhancement processing corresponds to an influencing factor which affects image quality. The influencing factors which affect image quality comprise at least noiseless low resolution, compression noise, acquisition noise and blur.

The image to be processed can be subjected to image enhancement processing through an image enhancement algorithm respectively, and at least through enhancement processing for noiseless low resolution, enhancement processing for compression noise, enhancement processing for acquisition noise and enhancement processing for blur, respectively. The enhancement processing for noiseless low resolution is used to improve the resolution of the image to be processed. The enhancement processing for compression noise is used to remove compression noise contained in the image to be processed. The enhancement processing for acquisition noise is used to remove acquisition noise contained in the image to be processed. The enhancement process for blur is used to remove blur contained in the image to be processed.

In one embodiment, the image enhancement processing can be performed on the image to be processed through a pre-established model, including the followings.

Regarding an image enhancement processing for noiseless low resolution, the image to be processed can be input into a pre-established first model to obtain an image pre-enhanced for the noiseless low resolution, wherein the first model is used to improve the resolution of the image to be processed.

Wherein, the pre-established first model can be a super resolution image reconstruction (SRIR) model, and the training samples of the SRIR model can be a high-definition image and a low-resolution image obtained by down-sampling and then up-sampling the high-definition image. That is, the high-definition image can be down-sampled to obtain a down-sampled image, and then the down-sampled image can be up-sampled to obtain a corresponding low-resolution image. An image enhanced for the noiseless low resolution is obtained with improved resolution by inputting the image to be processed into the SRIR model.

Regarding image enhancement processing for compression noise, the image to be processed can be input into a pre-established second model to obtain an image pre-enhanced for the compression noise, wherein the second model is used to reduce the compression noise contained in the image to be processed.

Wherein, the second model can be a compression noise removing model, and the training samples of the compression noise removing model can be a high-definition image and a low-resolution image containing compression noise obtained by JPEG compression of the high-definition image.

An enhanced image with the compression noise removed is obtained by inputting the image to be processed into the compression noise removing model.

Regarding image enhancement processing for acquisition noise, the image to be processed can be input into a pre-established third model to obtain an image pre-enhanced for the acquisition noise, wherein the third model is used to reduce the acquisition noise contained in the image to be processed.

Wherein, the third model can be an acquisition noise removing model, and the training samples of the acquisition noise removing model can be a high-definition image and a low-resolution image containing the acquisition noise corresponding to the high-definition image. An enhanced image with acquisition noise removed is obtained by inputting the image to be processed into the acquisition noise removing model.

Regarding image enhancement processing for blur, the image to be processed is input into a pre-established fourth model to obtain an image pre-enhanced for the blur, wherein the fourth model is used to reduce the blur contained in the image to be processed.

Wherein, the fourth model can be a deblurring model, and the training samples of the deblurring model can be a high-definition image and a low-resolution image containing blur corresponding to the high-definition image. A deblurred enhanced image is obtained by inputting the image to be processed into the deblurring model.

In an embodiment, the aforementioned image enhancement processing for different influencing factors can be executed simultaneously in different threads or processes, thereby further improving efficiency and saving time.

At S102, image quality classification is performed on a first image block in the image to be processed to obtain a first quality classification result for the first image block.

In the embodiment of the present application, the first quality classification result is used to indicate influencing factors existing in the first image block which affect image quality.

In one embodiment, an image block in the image to be processed is referred to as the first image block. That is, the first image block can be any image block in the image to be processed.

In one embodiment, the image to be processed can be cropped based on a preset cropping rule to obtain a cropped first image block.

The preset cropping rule can be determined according to the actual requirement and experience. As known to those skilled in the art, the size of a cropped image block can be adjusted by adjusting the batch_size (batch-size) and patch_size (patch-size) parameters of an image block. If a higher accuracy is required in an actual application, the cropped image block can be set smaller.

In one embodiment, the preset cropping rule can be: cropping the image to be processed into a first preset number of first image blocks with the same size. Wherein, the first preset number can be determined based on the actual requirement and experience, and the actual size of the image to be processed.

In this embodiment, after the first preset number is determined, the image to be processed can be equally divided and cropped to obtain the first preset number of image blocks. Exemplarily, if the first preset number is 10, the image to be processed is equally divided and cropped into 10 first image blocks with the same size.

In one embodiment, the preset cropping rule can also be: randomly cropping the image to be processed to obtain a second preset number of image blocks. Wherein, the second preset number can be determined based on the actual requirement and experience, and the actual size of the image to be processed, or can be determined randomly. For example, the image to be processed is randomly cropped to obtain n first image blocks, then the second preset number is n.

In one embodiment, for each first image block of the image to be processed, the first image block can be input to a pre-established quality classification model, and the output result of the quality classification model is used as a first quality classification result for the first image block. For example, the quality classification model can be a convolutional neural network model for classification. Specifically, the quality classification model can include a convolutional layer and a softmax function.

In one embodiment, the first quality classification result can be the existence probabilities of the influencing factors in the first image block. That is, the quality classification model can output the existence probabilities of the influencing factors in the first image block. As an example, after the image quality classification is performed on a first image block a, the first quality classification result for the first image block a is obtained as follows: the existence probability of noiseless low resolution is 10%, the existence probability of acquisition noise is 50%, the existence probability of compression noise is 15%, and the existence probability of blur is 25%.

In one embodiment, the output of the quality classification model can also be an influencing factor that has the largest influence on the image quality of the first image block. For example, after the image quality classification is performed on the first image block a, the first quality classification result for the first image block a is determined as an acquisition noise image.

At step S103, a target pre-enhanced image is determined from the plurality of pre-enhanced images based on the first quality classification result for the first image block.

In the embodiment of the present application, the type of image enhancement processing corresponding to the target pre-enhanced image is matched with the influencing factor existing in the first image block which affects the image quality and indicated by the first quality classification result.

In one embodiment, a pre-enhanced image corresponding to the first quality classification result for the first image block can be determined from pre-enhanced images as a target pre-enhanced image for the first image block based on the first quality classification result for the first image block.

In one embodiment, there are four pre-enhanced images, which are a noiseless low-resolution enhanced image, an enhanced image with compression noise removed, an enhanced image with acquisition noise removed, and a deblurred enhanced image.

In one embodiment, if the first quality classification result for the first image block indicates an influencing factor with the highest existence probability among influencing factors which affect the image quality of the first image block, then based on the influencing factor indicated by the first quality classification result for the first image block, a pre-enhanced image obtained by processing with respect to this influencing factor can be determined from pre-enhanced images as a target pre-enhanced image for the first image block k.

As an example, if the first quality classification result for the first image block a is noiseless low resolution, the noiseless low-resolution enhanced image is determined from the four pre-enhanced images as the target pre-enhanced image for the first image block a.

In one embodiment, if the first quality classification result indicates the existence probabilities of influencing factors, then based on the existence probabilities of influencing factors indicated by the first quality classification results for the first image block, the influencing factor with an existence probability greater than a first threshold can be determined from influencing factors which affect the image quality of the first image block as the first influencing factor for the first image block. Further, a pre-enhanced image obtained by processing with respect to the first influencing factor for the first image block is determined from pre-enhanced images as a target pre-enhanced image for the first image block. Wherein, the first threshold can be determined according to the actual usage scenario and experience. For example, the first threshold can be 0.

As an example, the first quality classification result for the first image block a is as follows: the existence probability of noiseless low resolution is 0%, the existence probability of acquisition noise is 55%, the existence probability of compression noise is 10%, and the existence probability of blur is 35%. Wherein, the first threshold is 0, and it can be determined that the first influencing factors for the first image block a include: acquisition noise, compression noise, and blur. Further, it is determined that the pre-enhanced images obtained by processing with respect to the first influencing factors for the first image block a are respectively: the enhanced image with acquisition noise removed, the enhanced image with compression noise removed and the deblurred enhanced image. Further, the enhanced image with acquisition noise removed, the enhanced image with compression noise removed and the deblurred enhanced image are determined as target pre-enhanced images of the first image block a.

At step S104, a second image block is determined in the target pre-enhanced image.

In the embodiment of the present application, an area where the second image block is located in the pre-enhanced image is the same as an area where the first image block is located in the image to be processed;

In one embodiment, the pixel value of the target pre-enhanced image for the first image block can be adjusted, and then based on the adjusted pixel value, an image of an area corresponding to the first image block can be obtained as the second image block. Specifically, reference can be made to the detailed description in the subsequent embodiments.

Alternatively, the area in the target pre-enhanced image corresponding to the first image block can also be directly determined as the second image block.

In one embodiment, if the first quality classification result for the first image block indicates an influencing factor with the highest existence probability among influencing factors which affect the image quality of the first image block, then an area in the target pre-enhanced image corresponding to the first image block can be obtained as the second image block.

As an example, the image to be processed is cropped into a first image block a and a first image block b, wherein the target pre-enhanced image for the first image block a is a noiseless low-resolution enhanced image. For the first image block a, an area in the noiseless low-resolution enhanced image corresponding to the first image block a can be obtained as the second image block corresponding to the first image block a.

At step S105, a target image is generated based on the second image block.

In the embodiment of the present application, the target image can be generated based on the second image blocks the number of which is the same as that of the image blocks in the image to be processed, wherein there is a one-to-one correspondence between the second image blocks and the first image blocks in the image to be processed.

In one embodiment, the second image blocks in a one-to-one correspondence to the first image blocks in the image to be processed can be spliced to generate the target image.

For example, the second image blocks can be spliced based on positions of the corresponding first image blocks in the image to be processed respectively to obtain the target image.

In one embodiment, the image to be processed is cropped into a first image block a and a first image block b, then a second image block corresponding to the first image block a and a second image block corresponding to the first image block b can be spliced.

In one embodiment, the second image block corresponding to the first image block a and the second image block corresponding to the first image block b can be spliced to generate the target image based on positions of the first image block a and the first image block b in the image to be processed.

In the method for generating an image according to the embodiment of the present application as shown in FIG. 1, a plurality of types of image enhancement processing can be performed on the image to be processed to obtain a plurality of pre-enhanced images, wherein each pre-enhanced image corresponds to one type of image enhancement processing, and each type of the image enhancement processing corresponds to an influencing factor which affects the image quality. Then, an image quality classification can be performed on a first image block in the image to be processed to obtain a first quality classification result for the first image block, wherein the first quality classification result is used to indicate influencing factors existing in the first image block which affect the image quality. Then, a target pre-enhanced image can be determined from the plurality of pre-enhanced images based on the first quality classification result for the first image block, wherein the type of image enhancement processing corresponding to the target pre-enhanced image is matched with an influencing factor existing in the first image block which affects the image quality and indicated by the first quality classification result. And then, a second image block is determined in the target pre-enhanced image, wherein the area where the second image block is located in the pre-enhanced image is the same as the area where the first image block is located in the image to be processed, and the target image is generated based on the second image block. Since quality classification is performed on the first image block, so that the influencing factors which affect the image quality of the first image block can be determined, and in conjunction with that the second image block is determined through the pre-enhanced images to generate a target image, thereby the image enhancement effect is improved.

Figure 2:
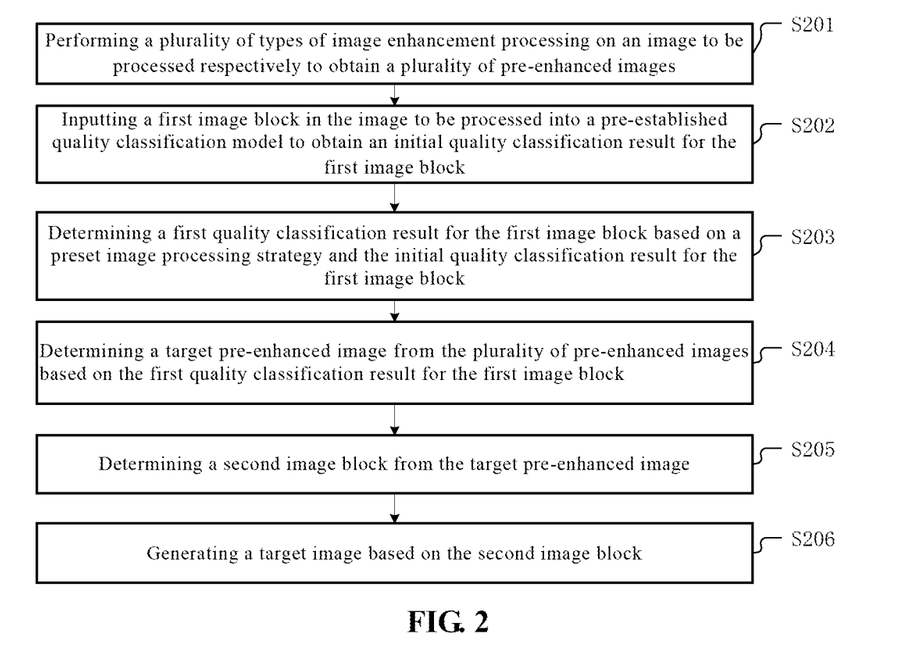
FIG. 2 is a flowchart of a method for generating an image according to another embodiment of the present application.

In one embodiment of the present application, another method for generating an image is provided as shown in FIG. 2. The method includes the following steps.

At step S201, a plurality of types of image enhancement processing are performed on an image to be processed respectively to obtain a plurality of pre-enhanced images.

In the embodiment of the present application, the specific implementation of step S201 is the same as or similar to that of step S101, and is not repeated here.

At step S202, a first image block in the image to be processed is input into a pre-established quality classification model to obtain an initial quality classification result for the first image block.

In the embodiment of the present application, the pre-established quality classification model can be obtained by adopting an image quality classification scheme based on deep learning, constructing a convolutional neural network model and inputting a large number of training samples (image blocks and quality classification labels thereof) for training. For example, the quality classification model can be a convolutional neural network model. Specifically, the quality classification model can include a convolutional layer and a softmax function.

In one implementation, the training samples of the quality classification model can be generated based on the method for acquiring the noiseless low-resolution image, the low-resolution image with compression noise, the low-resolution image with acquisition noise, and the low-resolution image with blur in the foregoing embodiment. Accordingly, the generated quality classification labels of the training samples respectively represent the noiseless low-resolution image, the low-resolution image with compression noise, the low-resolution image with acquisition noise, and the low-resolution image with blur.

In order to improve the accuracy of quality classification of the first image block, the quality classification result output from the quality classification model can be used as an initial quality classification result for the first image block, and then a final quality classification result is obtained based on the initial quality classification result and a preset image processing strategy.

In one embodiment, the initial quality classification result includes existence probabilities of influencing factors. As an example, the initial quality classification result for the first image block a, which is output from the network last layer softmax function of the convolutional neural network model constructed after training the inputted first image block a, is as follows: the existence probability of noiseless low resolution is 10%, the existence probability of acquisition noise is 50%, the existence probability of compression noise is 15%, and the existence probability of blur is 25%. That is, the first image block a can be input to the trained convolutional neural network model, and an output result of the network last layer softmax function of the convolutional neural network model can be used as the initial quality classification result for the first image block a.

At step S203, a first quality classification result for the first image block is determined based on a preset image processing strategy and the initial quality classification result for the first image block.

In the embodiment of the present application, different first quality classification results can be determined using different image processing strategies. When the initial quality classification result includes the existence probabilities of influencing factors, optionally, the step S203 can be performed as follows.

When the image processing strategy (which can be referred to as a first image processing strategy) indicates that the first quality classification result is the influencing factor with the largest existence probability in the initial quality classification result, and the following method is used.

The influencing factor with the largest existence probability in the initial quality classification result for the first image block is determined as a target influencing factor for the first image block, and a first quality classification result for the first image block is determined based on the target influencing factor for the first image block.

When the image processing strategy (which can be referred to as a second image processing strategy) indicates that the initial quality classification result is considered comprehensively, the above step can be performed as follows.

At step A, an image block which corresponds to the first image block in position is determined as a reference image block corresponding to the first image block based on the position of the first image block in the image to be processed.

The image block which corresponds to the first image block in position can be an image block associated with the first image block in position. For example, it can be an image block adjacent to the first image block in position, or an image block connected to the first image block in position.

In the embodiment of the present application, the image block which corresponds to the first image block in position can be another first image block adjacent to this first image block.

Figure 3:
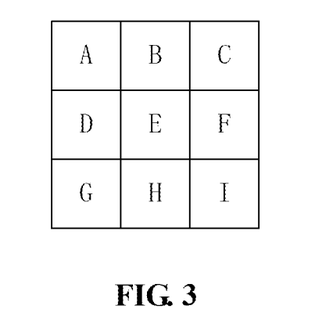
FIG. 3 is a schematic diagram illustrating cropping of an image to be processed according to an embodiment of the present application.

As an example, there are 9 first image blocks, which are respectively denoted by A, B, C, D, E, F, G, H and I, in the image to be processed as shown in FIG. 3. For the first image block E, the first image blocks adjacent to the first image block E are B, D, F and H respectively. For the first image block A, the first image blocks adjacent to the first image block A are B and D respectively.

The image block which corresponds to the first image block in position can also be another first image block connected to this first image block.

As an example, for the first image block E as shown in FIG. 3, the first image blocks adjacent to the first image block E are A, B, C, D, F, G H and I, respectively. For the first image block A, the first image blocks connected to the first image block A are B, D and E, respectively.

At step B, a comprehensive quality classification result for the first image block is determined as the first quality classification result for the first image block based on the initial quality classification result for the first image block and the initial quality classification result for the reference image block corresponding to the first image block.

In one embodiment, step B can be performed as follows.

The first way is to determine whether the initial quality classification results for the reference image blocks corresponding to the first image block are the same. If the initial quality classification results for the reference image blocks corresponding to the first image block are the same, the initial quality classification results for the reference image blocks corresponding to the first image block can be determined as the comprehensive quality classification result for the first image block. Otherwise, the initial quality classification result for the first image block can be determined as the comprehensive quality classification result for the first image block.

As an example, for the first image block A as shown in FIG. 3, its adjacent first image blocks are B and D, respectively. If the initial quality classification results for the first image block B and the first image block D are the same, for example, the initial quality classification results for the first image block B and the first image block D are both acquisition noise image, then the comprehensive classification result for the first image block A is determined as the acquisition noise image. If the initial quality classification result for the first image block A is a noiseless low-resolution image, the initial quality classification result for the first image block B is a compression noise low-resolution image, and the initial quality classification result for the first image block D is an acquisition noise image, then the comprehensive classification result for the first image block A is determined as the noiseless low-resolution image.

The second way is to adjust the existence probability of each influencing factor in the first image block based on the existence probability of each influencing factor in the reference image blocks corresponding to the first image block, and use the adjusted existence probability of each influencing factor in the first image block as the existence probability of each influencing factor contained in the comprehensive quality classification result for the first image block.

In one embodiment, for each influencing factor, an average value of the existence probability of the influencing factor in the first image block and existence probabilities of the influencing factor in the corresponding reference image blocks can be calculated as the existence probability of the influencing factor contained in the comprehensive quality classification result for the first image block.

For the first image block A as shown in FIG. 3, its adjacent first image blocks are B and D, respectively. If the initial quality classification result for the first image block A is that the existence probability of noiseless low resolution is 10%, the existence probability of acquisition noise is 50%, the existence probability of compression noise is 15%, and the existence probability of blur is 25%; the initial quality classification result for the first image block B is that the existence probability of noiseless low resolution is 0%, the existence probability of acquisition noise is 20%, the existence probability of compression noise is 55%, and the existence probability of blur is 25%; and the initial quality classification result for the first image block D is that the existence probability of noiseless low resolution is 20%, the existence probability of acquisition noise is 20%, the existence probability of compression noise is 20%, and the existence probability of blur is 40%, then the average existence probability of noiseless low resolution of the first image blocks A, B and D is calculated as (10%+0%+20%)/3=10%, the average existence probability of acquisition noise is (50%+20%+20%)/3=30%, the average existence probability of compression noise is (15%+55%+20%)/3=30%, and the average existence probability of blur is (25%+25%+40%)/3=30%. The comprehensive quality classification result for the first image block A (i.e. the first quality classification result for the first image block A) is that the existence probability of noiseless low resolution is 10%, the existence probability of acquisition noise is 30%, the existence probability of compression noise is 30%, and the existence probability of blur is 30%. It should be understood that the above numerical values are only examples for illustrative purposes, and the present application is not limited to the above numerical values.

At step S204, a target pre-enhanced image is determined from the plurality of pre-enhanced images based on the first quality classification result for the first image block.

In the embodiment of the present application, when the first quality classification result is determined based on the target influencing factor, the target pre-enhanced image can be determined from the plurality of pre-enhanced images based on the target influencing factor for the first image block.

In one embodiment, during the image processing, the first image processing strategy or the second image processing strategy can be adopted. Different first quality classification results can be determined by using different image processing strategies, so that different target pre-enhanced images are determined.

In one embodiment, if the first quality classification result for the first image block indicates an influencing factor with the highest existence probability among the influencing factors which affect the image quality of the first image block, then the pre-enhanced image corresponding to the influencing factor indicated by the first quality classification result can be determined as the target pre-enhanced image for the first image block.

In one embodiment, if the first quality classification result indicates the existence probabilities of influencing factors, an influencing factor with an existence probability larger than a first threshold among the influencing factors which affect the image quality of the first image block can be determined, and then, the pre-enhanced image corresponding to this influencing factor is determined as the target pre-enhanced image for the first image block. In this case, there can be one or more target pre-enhanced images determined.

In one embodiment, the determination of the target pre-enhanced image is similar to step S103, and is not be repeated here.

At step S205, a second image block is determined in the target pre-enhanced image.

In one embodiment, if the first quality classification result indicates the existence probabilities of influencing factors, it can be achieved in the following ways.

If one target pre-enhanced image is determined, then an image block whose position in the target pre-enhanced image is the same as the position of the first image block in the image to be processed can be determined as a second image block.

If a plurality of target pre-enhanced images are determined, then the pixel value of each pixel in each of the target pre-enhanced image can be obtained, and the pixel values of the pixels in the target pre-enhanced images corresponding to a target pixel are weighted and summed to obtain a comprehensive pixel value for the corresponding target pixel. The target pixel is a pixel in the first image block, and the weight of the pixel in each target pre-enhanced image is the existence probability of the influencing factor for each target pre-enhanced image in the first image block, and then the pixel value of the target pixel can be adjusted to be the comprehensive pixel value to generate a second image block corresponding to the first image block.

For each pixel of the first image block, the pixel values of the pixels corresponding to the first image block in the noiseless low-resolution enhanced image, the enhanced image with acquisition noise removed, the enhanced image with compression noise removed and the deblurred enhanced image can be obtained respectively. For example, the obtained pixel values are x1, x2, x3, and x4 respectively, and x1, x2, x3, and x4 are weighted and summed by taking 15%, 35%, 25%, and 25% as weights respectively, and the summation result is used as the pixel value of the pixel.

At step S206, a target image is generated based on the second image block.

After each second image block is obtained, second image blocks can be spliced based on the positions of the first image block corresponding to the second image blocks in the image to be processed to obtain the target image.

In the embodiment of the present application, the specific implementation is the same as or similar to that of step S105, and is not be repeated here.

In the above-mentioned method for generating an image according to the embodiment of the present application as shown in FIG. 2, a plurality of types of image enhancement processing are performed on the image to be processed to obtain a plurality of pre-enhanced images. The first image block in the image to be processed then can be input into a pre-established quality classification model to obtain an initial quality classification result for the first image block. Then, a first quality classification result for the first image block is determined based on a preset image processing strategy and the initial quality classification result for the first image block, and a target pre-enhanced image is determined from the plurality of pre-enhanced images based on a target influencing factor for the first image block. And then, a second image block is determined in the target pre-enhanced image, and a target image is generated based on the second image block. Since quality classification is performed on the first image block, the influencing factors which affect the image quality of the first image block can be determined, and in conjunction with that the second image block is determined through the pre-enhanced images to generate a target image, so that the image enhancement effect is improved.

Figure 4:
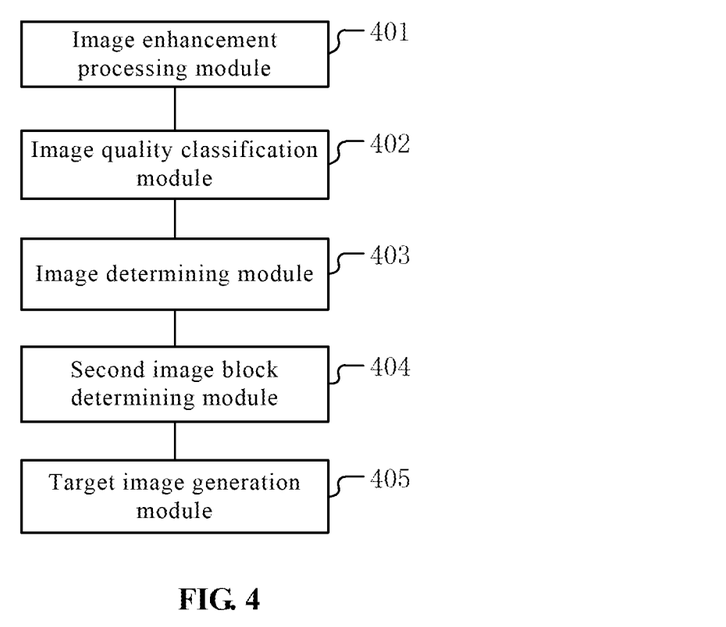
FIG. 4 is a schematic structural diagram of an apparatus for generating an image according to an embodiment of the present application.

Based on the same inventive concept, and according to the method for generating an image according to the embodiment of the present application, an embodiment of the present application further provides an apparatus for generating an image as shown in FIG. 4. The apparatus includes:

an image enhancement processing module 401 configured for performing a plurality of types of image enhancement processing on an image to be processed respectively to obtain a plurality of pre-enhanced images, wherein each pre-enhanced image corresponds to one type of image enhancement processing, and each type of image enhancement processing corresponds to an influencing factor which affects the image quality;

an image quality classification module 402 configured for performing image quality classification on a first image block in the image to be processed to obtain a first quality classification result for the first image block, wherein the first quality classification result is used to indicate influencing factors existing in the first image block which affect the image quality;

an image determining module 403 configured for determining a target pre-enhanced image from a plurality of pre-enhanced images based on the first quality classification result for the first image block, wherein the type of image enhancement processing corresponding to the target pre-enhanced image is matched with an influencing factor existing in the first image block which affects the image quality and indicated by the first quality classification result;

a second image block determining module 404 configured for determining a second image block in the target pre-enhanced image, wherein the area where the second image block is located in the pre-enhanced image is the same as the area where the first image block is located in the image to be processed;

a target image generation module 405 configured for generating a target image based on the second image block.

In one embodiment, the image quality classification module 402 is specifically configured for inputting the first image block in the image to be processed into a pre-established quality classification model to obtain an initial quality classification result for the first image block, wherein the quality classification model is used to perform quality classification on the image; and determining the first quality classification result for the first image block based on a preset image processing strategy and the initial quality classification result for the first image block.

In one embodiment, the initial quality classification result includes the existence probabilities of influencing factors.

The image quality classification module 402 is specifically configured for determining an influencing factor with the largest existence probability in the initial quality classification result for the first image block, as a target influencing factor for the first image block, and determining the first quality classification result for the first image block based on the target influencing factor for the first image block.

In one embodiment, the image determining module 403 is specifically configured for determining the target pre-enhanced image from the plurality of pre-enhanced images based on the target influencing factor for the first image block.

In one embodiment, the image quality classification module 402 is specifically configured for determining an image block which corresponds to the first image block in position as a reference image block corresponding to the first image block based on the position of the first image block in the image to be processed, and determining a comprehensive quality classification result for the first image block as the first quality classification result for the first image block based on the initial quality classification result for the first image block and the initial quality classification result for the reference image block corresponding to the first image block.

In one embodiment, the image quality classification module 402 is specifically configured for determining whether the initial quality classification results for the reference image blocks corresponding to the first image block are the same, and if the initial quality classification results for the reference image blocks corresponding to the first image block are the same, determining the initial quality classification results for the reference image blocks corresponding to the first image block as the comprehensive quality classification result for the first image block, and otherwise, determining the initial quality classification result for the first image block as the comprehensive quality classification result for the first image block.

In one embodiment, the initial quality classification result includes the existence probabilities of the influencing factors.

The image quality classification module 402 is specifically configured for adjusting the existence probability of each influencing factor in the first image block based on the existence probability of each influencing factor in the reference image blocks corresponding to the first image block, and use the adjusted existence probability of each influencing factor in the first image block as the existence probability of each influencing factor contained in the comprehensive quality classification result for the first image block.

In one embodiment, the second image block determining module 404 is configured for obtaining a pixel value of each pixel in each target pre-enhanced image; weighting and summing the pixel values of the pixels in target pre-enhanced images corresponding to a target pixel to obtain a comprehensive pixel value for the corresponding target pixel, wherein the target pixel is a pixel in the first image block, and the weight of the pixel in each target pre-enhanced image is the existence probability of the influencing factor for each target pre-enhanced image in the first image block; and adjusting the pixel value of the target pixel to be the comprehensive pixel value to generate a second image block corresponding to the first image block.

In one embodiment, the influencing factors include at least noiseless low resolution, compression noise, acquisition noise, and blur.

The image enhancement processing module 401 is specifically configured for inputting the image to be processed into a pre-established first model to obtain an image pre-enhanced for the noiseless low resolution, wherein the first model is used to improve the resolution of the image to be processed; inputting the image to be processed into a pre-established second model to obtain an image pre-enhanced for the compression noise, wherein the second model is used to remove compression noise contained in the image to be processed; inputting the image to be processed into a pre-established third model to obtain an image pre-enhanced for the acquisition noise, wherein the third model is used to remove acquisition noise contained in the image to be processed; and inputting the image to be processed into a pre-established fourth model to obtain an image pre-enhanced for the blur, wherein the fourth model is used to remove blur contained in the image to be processed.

In one embodiment, the target image generation module 405 is specifically configured for splicing second image blocks respectively based on positions of the first image blocks corresponding to the second image blocks in the image to be processed to obtain a target image.

Figure 5:
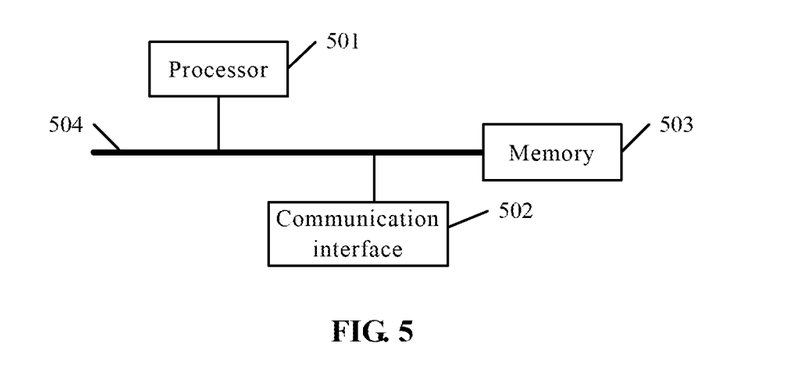
FIG. 5 is a schematic structural diagram of an electronic device according to an embodiment of the present application.

An embodiment of the present application further provides an electronic device as shown in FIG. 5. The electronic device includes a processor 501, a communication interface 502, a memory 503 and a communication bus 504, wherein the processor 501, the communication interface 502 and the memory 503 communication with each other through the communication bus 504.

The memory 503 is configured for storing computer programs.

The processor 501 is configured for performing the following steps when executing the computer programs stored on the memory 503:
  performing a plurality of types of image enhancement processing on an image to be processed respectively to obtain a plurality of pre-enhanced images, wherein each pre-enhanced image corresponds to one type of image enhancement processing, and each type of the image enhancement processing corresponds to an influencing factor which affects image quality;
  performing image quality classification on a first image block in the image to be processed to obtain a first quality classification result for the first image block, wherein the first quality classification result is used to indicate influencing factors existing in the first image block which affect the image quality;
  determining a target pre-enhanced image from the plurality of pre-enhanced images based on the first quality classification result for the first image block, wherein the type of image enhancement processing corresponding to the target pre-enhanced image is matched with an influencing factor existing in the first image block which affects the image quality and indicated by the first quality classification result;
  determining a second image block in the target pre-enhanced image, wherein the area where the second image block is located in the pre-enhanced image is the same as the area where the first image block is located in the image to be processed;
  generating a target image based on the second image block.

The communication bus mentioned in the electronic device can be a Peripheral Component Interconnect (PCI) bus, an Extended Industry Standard Architecture (EISA) bus, or the like. The communication bus can be divided into an address bus, a data bus, a control bus, etc. For ease of illustration, only one thick line is used in the figure, but it does not mean that there is only one bus or one type of bus.

The communication interface is used for communication between the electronic device and other devices.

The memory can include a Random Access Memory (RAM) or a Non-Volatile Memory (NVM), such as at least one disk memory. Optionally, the memory can be at least one memory device located remote from the processor.

The processor can be a general-purpose processor, including a Central Processing Unit (CPU), a Network Processor (NP), and the like. It can also be a Digital Signal Processing (DSP), an Application Specific Integrated Circuit (ASIC), a Field Programmable Gate Array (FPGA) or another programmable logic device, discrete gate or transistor logic device, discrete hardware component.

Another embodiment of the present application further provides a computer-readable storage medium, on which computer programs are stored. The computer programs causes a processor to perform any one of the methods for generating an image when executed.

Another embodiment of the present application further provides a computer program product containing instructions which, when executed, cause a computer to perform the steps of any one of the methods for generating an image.

In the above embodiments, it can be implemented in whole or in part by software, hardware, firmware, or any combination thereof. When implemented by software, it can be implemented in whole or in part in the form of a computer program product. The computer program product includes one or more computer instructions. The procedures or functions described in accordance with the embodiments of the present application are all or partially generated when the computer program instructions are loaded on and executed by a computer. The computer can be a general-purpose computer, a dedicated computer, a computer network, or another programmable device. The computer instructions can be stored in a computer-readable storage medium or transmitted from one computer-readable storage medium to another computer-readable storage medium. For example, the computer instructions can be transmitted from one website, computer, server, or data center to another website, computer, server, or data center via wired (e.g., a coaxial cable, an optical fiber, a Digital Subscriber Line (DSL)) or wireless (e.g., infrared, wireless, microwave, etc.) means. The computer-readable storage medium can be any usable medium that can be accessed by a computer or a data storage device, such as a server, a data center, etc., that includes one or more available medium. The usable medium can be a magnetic medium (e.g., a floppy disk, a hard disk, a magnetic tape), an optical medium (e.g., DVD), or a semiconductor medium (e.g., a Solid State Disk (SSD)), and the like.

It should be noted herein that, relational terms such as first and second, and the like are only used for distinguishing one entity or operation from another entity or operation without necessarily requiring or implying any actual such relationship or order between such entities or operations. Also, the terms "comprises", "include" or any other variation thereof are intended to cover a non-exclusive inclusion, such that a process, method, article, or device that comprises a series of elements not only includes those elements, but also includes other elements not expressly listed or inherent to such process, method, article, or device. Without further limitation, the element defined by the sentence "comprise a . . . " does not exclude the existence of other identical elements in the process, method, article, or device that comprises the element.

The various embodiments in this specification are described in a related manner, and the same or similar parts among the various embodiments can be referred to each other, and the description of each embodiment focuses on the differences from other embodiments. In particular, as for the apparatus, the electronic device, the computer-readable storage medium, and the computer program product, since they are substantially similar to the method embodiments, the description is relatively simple, and reference can be made to the partial description of the method embodiments for relevant parts.

The above description is only a preferred embodiment of the present application and should not be taken as an limitation to the present application, and any modifications, equivalents, improvements and the like made within the spirit and principle of the present application should be included in the protection scope of the present application.

INDUSTRIAL APPLICABILITY

Based on the technical solution according to the embodiments of the present application, since quality classification is performed on a first image block, the influencing factors which affect the image quality of the first image block can be determined, and in conjunction with that the second image block is determined through the pre-enhanced images to generate the target image. In other words, different image blocks in the image to be processed can be enhanced respectively according to their image qualities, so that the problem of poor effect of unitary image processing on the entire image is solved, thereby the image enhancement effect is improved.

What is claimed is:

1. A method for generating an image, comprising:
performing a plurality of types of image enhancement processing on an image to be processed respectively to obtain a plurality of pre-enhanced images, wherein each of the pre-enhanced images corresponds to one type of image enhancement processing, and each type of the image enhancement processing corresponds to an influencing factor which affects image quality;
performing image quality classification on a first image block in the image to be processed to obtain a first quality classification result for the first image block, wherein the first quality classification result is used to indicate influencing factors existing in the first image block which affect the image quality;
determining a target pre-enhanced image from the plurality of pre-enhanced images based on the first quality classification result for the first image block, wherein the type of image enhancement processing corresponding to the target pre-enhanced image is matched with an influencing factor existing in the first image block which affects the image quality and indicated by the first quality classification result;
determining a second image block in the target pre-enhanced image, wherein an area where the second image block is located in the pre-enhanced image is the same as an area where the first image block is located in the image to be processed; and
generating a target image based on the second image block;
wherein the influencing factors comprise at least noiseless low resolution, compression noise, acquisition noise, and blur;

performing a plurality of types of image enhancement processing on an image to be processed respectively to obtain a plurality of pre-enhanced images comprises:
inputting the image to be processed into a pre-established first model to obtain an image pre-enhanced for the noiseless low resolution, wherein the first model is used to improve a resolution of the image to be processed;
inputting the image to be processed into a pre-established second model to obtain an image pre-enhanced for the compression noise, wherein the second model is used to remove the compression noise contained in the image to be processed;
inputting the image to be processed into a pre-established third model to obtain an image pre-enhanced for the acquisition noise, wherein the third model is used to remove the acquisition noise contained in the image to be processed; and
inputting the image to be processed into a pre-established fourth model to obtain an image pre-enhanced for the blur, wherein the fourth model is used to remove the blur contained in the image to be processed.

2. The method according to claim 1, wherein performing image quality classification on a first image block in the image to be processed to obtain a first quality classification result for the first image block comprises:
inputting the first image block in the image to be processed into a pre-established quality classification model to obtain an initial quality classification result for the first image block, wherein the quality classification model is used to perform quality classification on an image;
determining the first quality classification result for the first image block based on a preset image processing strategy and the initial quality classification result for the first image block.

3. The method according to claim 2, wherein the initial quality classification result comprises existence probabilities of influencing factors;
determining the first quality classification result for the first image block based on a preset image processing strategy and the initial quality classification result for the first image block comprises:
determining an influencing factor with the largest existence probability in the initial quality classification result for the first image block as a target influencing factor for the first image block;
determining the first quality classification result for the first image block based on the target influencing factor for the first image block.

4. The method according to claim 3, wherein determining a target pre-enhanced image from the plurality of pre-enhanced images based on the first quality classification result for the first image block comprises:
determining the target pre-enhanced image from the plurality of pre-enhanced images based on the target influencing factor for the first image block.

5. The method according to claim 2, wherein determining the first quality classification result for the first image block based on a preset image processing strategy and the initial quality classification result for the first image block comprises:
determining an image block which corresponds to the first image block in position as a reference image block corresponding to the first image block based on a position of the first image block in the image to be processed;

determining a comprehensive quality classification result for the first image block as the first quality classification result for the first image block based on the initial quality classification result for the first image block and an initial quality classification result for the reference image block corresponding to the first image block.

6. The method according to claim 5, wherein determining a comprehensive quality classification result for the first image block as the first quality classification result for the first image block based on the initial quality classification result for the first image block and an initial quality classification result for the reference image block corresponding to the first image block comprises:

determining whether initial quality classification results for reference image blocks corresponding to the first image block are the same;

if the initial quality classification results for the reference image blocks corresponding to the first image block are the same, determining the initial quality classification results for the reference image blocks corresponding to the first image block as the comprehensive quality classification result for the first image block; and if the initial quality classification results for the reference image blocks corresponding to the first image block are different, determining the initial quality classification result for the first image block as the comprehensive quality classification result for the first image block.

7. The method according to claim 5, wherein the initial quality classification result comprises existence probabilities of the influencing factors;

determining a comprehensive quality classification result for the first image block based on the initial quality classification result for the first image block and an initial quality classification result for the reference image block corresponding to the first image block comprises:

adjusting an existence probability of each of the influencing factors in the first image block based on the existence probability of each of the influencing factors in the reference image block corresponding to the first image block, and using the adjusted existence probability of each of the influencing factors in the first image block as the existence probability of each of the influencing factors contained in the comprehensive quality classification result for the first image block.

8. The method according to claim 6, wherein determining a second image block in the target pre-enhanced image comprises:

obtaining a pixel value of each pixel in each of target pre-enhanced images;

weighting and summing pixel values of pixels in the target pre-enhanced images corresponding to a target pixel to obtain a comprehensive pixel value for the target pixel, wherein the target pixel is a pixel in the first image block, and a weight of the pixel in each of the target pre-enhanced images is an existence probability of an influencing factor for each of the target pre-enhanced images in the first image block; and adjusting a pixel value of the target pixel to be the comprehensive pixel value to generate the second image block corresponding to the first image block.

9. The method according to claim 1, wherein generating a target image based on the second image block comprises:

splicing second image blocks based on positions of the first image blocks corresponding to the second image blocks in the image to be processed to obtain the target image.

10. An apparatus for generating an image, comprising a memory and a processor, wherein the processor comprises an image enhancement processing module, an image quality classification module, an image determining module, a second image block and a target image generation module;

wherein the image enhancement processing module is configured for performing a plurality of types of image enhancement processing on an image to be processed respectively to obtain a plurality of pre-enhanced images, wherein each of the pre-enhanced images corresponds to one type of image enhancement processing, and each type of the image enhancement processing corresponds to an influencing factor which affects image quality;

the image quality classification module is configured for performing image quality classification on a first image block in the image to be processed to obtain a first quality classification result for the first image block, wherein the first quality classification result is used to indicate influencing factors existing in the first image block which affect the image quality;

the image determining module is configured for determining a target pre-enhanced image from the plurality of pre-enhanced images based on the first quality classification result for the first image block, wherein the type of image enhancement processing corresponding to the target pre-enhanced image is matched with the influencing factor existing in the first image block which affects the image quality and indicated by the first quality classification result;

the second image block determining module is configured for determining a second image block in the target pre-enhanced image, wherein an area where the second image block is located in the pre-enhanced image is the same as an area where the first image block is located in the image to be processed;

the target image generation module is configured for generating a target image based on the second image block;

wherein the influencing factors comprise at least noiseless low resolution, compression noise, acquisition noise, and blur;

wherein the image enhancement processing module is further configured for:

inputting the image to be processed into a pre-established first model to obtain an image pre-enhanced for the noiseless low resolution, wherein the first model is used to improve a resolution of the image to be processed;

inputting the image to be processed into a pre-established second model to obtain an image pre-enhanced for the compression noise, wherein the second model is used to remove the compression noise contained in the image to be processed;

inputting the image to be processed into a pre-established third model to obtain an image pre-enhanced for the acquisition noise, wherein the third model is used to remove the acquisition noise contained in the image to be processed; and inputting the image to be processed into a pre-established fourth model to obtain an image pre-enhanced for the blur, wherein the fourth model is used to remove the blur contained in the image to be processed.

11. An electronic device, comprising a processor and a memory;

wherein the memory has stored thereon computer programs which, when executed, cause the processor to perform the method according to claim 1.

12. A non-transitory computer-readable storage medium having stored thereon computer programs which, when executed, cause a processor to perform the method according to claim 1.

* * * * *